Oct. 13, 1925.

B. F. DUPONT 1,556,771

ROOT CUTTER

Filed July 13, 1923

B. F. Dupont
INVENTOR

BY Victor J. Evans
ATTORNEY

WITNESS:

Oct. 13, 1925.
B. F. DUPONT
ROOT CUTTER
Filed July 13, 1923
1,556,771
3 Sheets-Sheet 2
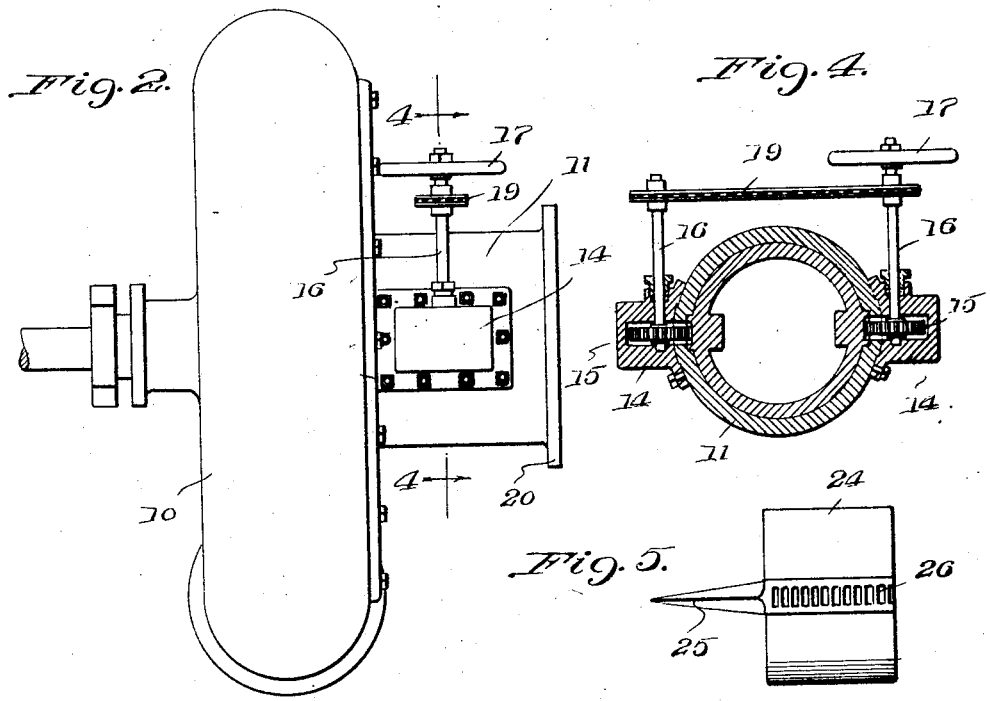
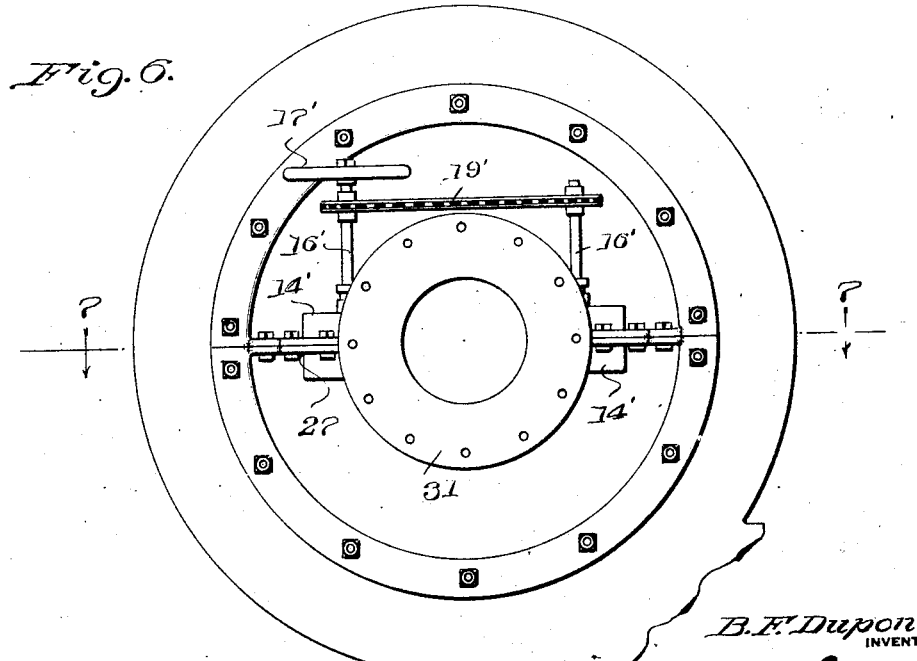
B. F. Dupont
INVENTOR
BY Victor J. Evans
ATTORNEY
WITNESS:

Oct. 13, 1925.
B. F. DUPONT
ROOT CUTTER
Filed July 13, 1923
1,556,771
3 Sheets-Sheet 3
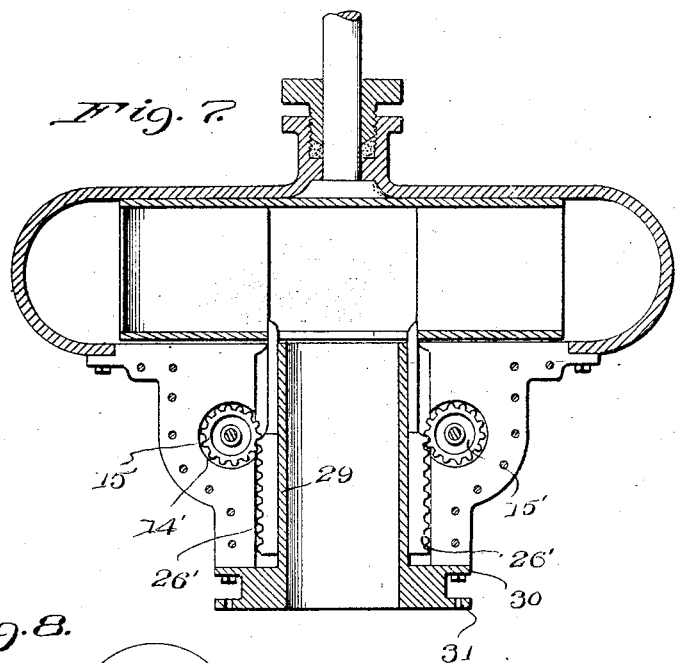
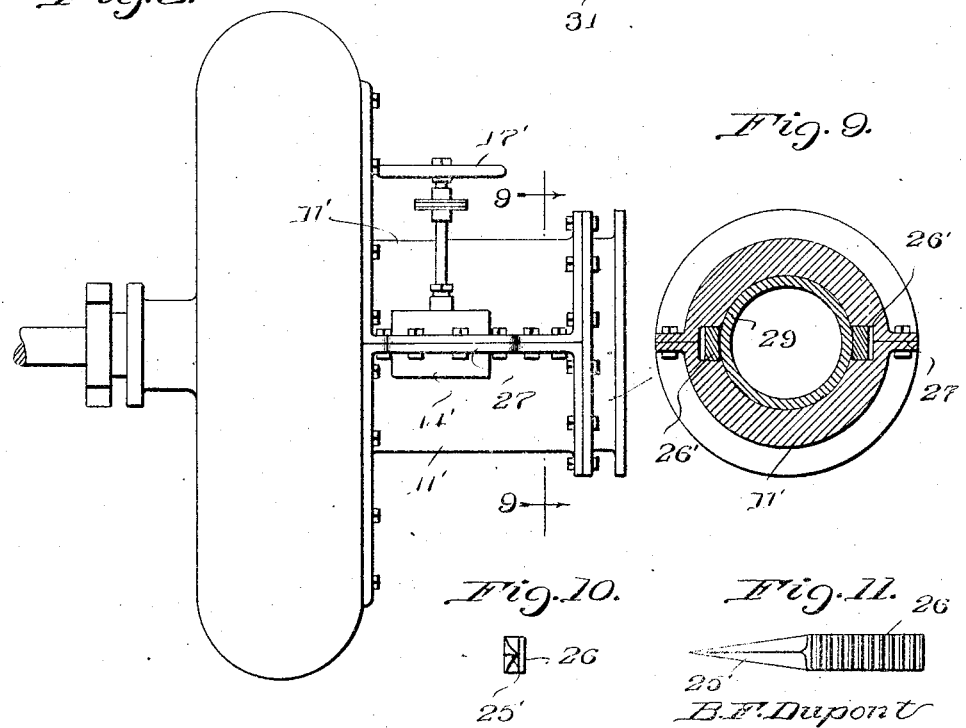
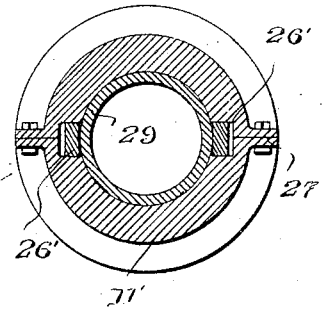
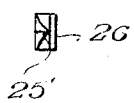
B. F. Dupont
INVENTOR
BY Victor J. Evans
ATTORNEY
WITNESS:

Patented Oct. 13, 1925.

1,556,771

UNITED STATES PATENT OFFICE.

BENJAMIN F. DUPONT, OF MIAMI, FLORIDA.

ROOT CUTTER.

Application filed July 13, 1923. Serial No. 651,357.

*To all whom it may concern:*

Be it known that I, BENJAMIN F. DUPONT, a citizen of the United States, residing at Miami, in the county of Dade and State of Florida, have invented new and useful Improvements in Root Cutters, of which the following is a specification.

This invention relates to dredging pumps, and has particular application to a cutter attachment therefor.

Pumps of the above mentioned character, when dredging where there are roots, rocks, vines, etc., are frequently rendered inoperative by reason of the fact that the roots and the like lap over the vanes of the impeller thereby shutting off water and the materials. When this occurs, it is necessary to remove a plate from the pump to permit access to be had to the latter for cleaning the same which requirement is troublesome with a consequent loss of time.

It is therefore the purpose of this invention to provide a cutter attachment including a plurality of cutting blades susceptible of sliding movement with relation to the impeller, with means for conveniently moving the cutter into a position to cut off the vines, roots, etc., from the vanes while the pump is in operation, thereby keeping the impeller free from anything that would tend to hinder its movement or cut off the water and materials.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is a view taken at a right angle to Figure 1.

Figure 4 is a sectional view taken on the line 4—4 of Figure 2.

Figure 5 is a detail view of the sleeve and cutter bar.

Figure 6 is a view in elevation of a modified construction.

Figure 7 is a sectional view taken on the line 7—7 of Figure 6.

Figure 8 is a view taken at a right angle to Figure 6.

Figure 9 is a sectional view taken on the line 9—9 of Figure 8.

Figure 10 is an end elevation of one of the cutter bars.

Figure 11 is a plan view of said bars.

Figure 1:
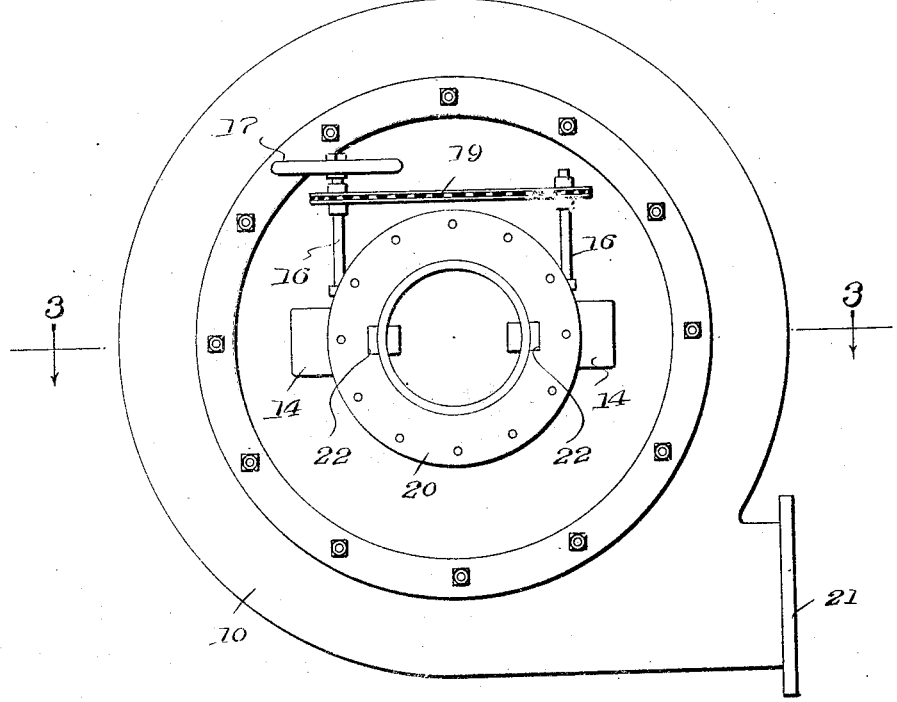
Figure 1 is a view in elevation of the invention constructed in accordance with the preferred embodiment thereof.

Referring to the drawings in detail 10 represents the body of the pump including the extension 11 which projects centrally from the pump casing and in which the cutter operates toward and away from the vanes 12 of the impeller indicated generally at 13. This extension 11 is formed at diametrically opposite points with housings 14 for the pinions 15, the latter being mounted on shafts 16 as clearly illustrated. These shafts are simultaneously rotated to effect an operation of the cutter, and while the shafts may be thus rotated in any suitable manner, this is preferably accomplished through the medium of a hand wheel 17. This hand wheel is mounted on one of a pair of spaced parallel shafts 16 which are suitably connected together by a chain 19, so that when the hand wheel is rotated, motion is imparted to both of the shafts 18, which in turn are suitably geared to the shafts carrying the pinions 15. The extension 11 is formed with a flange 20 at one end to provide for connection with the intake pipe, the discharge opening of the pump casing being indicated at 21. This extension is further provided with spaced parallel grooves 22 for the cutter bars to slide in.

Figure 3:
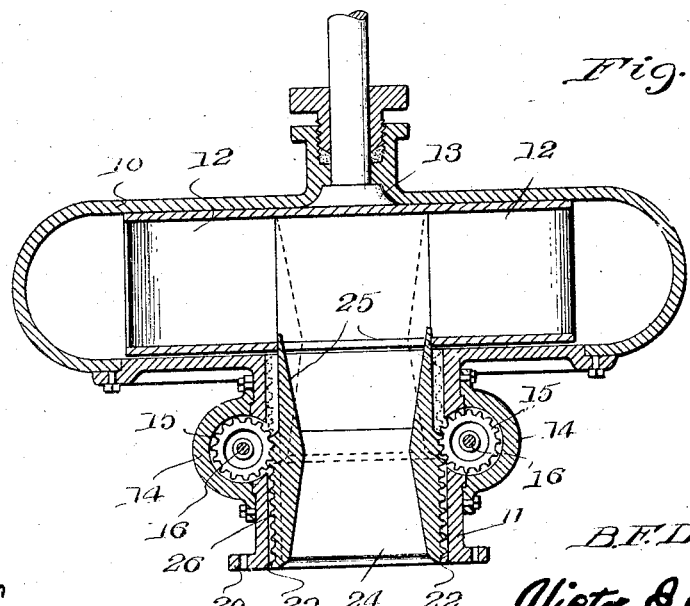
Figure 3 is a sectional view taken on the line 3—3 of Figure 1.

The cutter proper consists of a sleeve or thimble 24 of a size to snugly fit within the extension 11, being mounted for sliding movement toward and away from the impeller as above stated. Projecting in one direction from the periphery of the thimble is a plurality of cutting bars 25 which slide in the grooves above referred to, and which are adapted to be moved to the position shown in Figure 3, for the purpose of cutting the vines, roots and the like from the vanes of the impeller and thereby keeping the impeller free from any foreign matter that would tend to retard the movement of the impeller or actually cause the stopping of the pump. The exterior surface of that portion of each cutting bar arranged directly above the thimble or sleeve is formed with teeth 26 to mesh with the teeth of the pinions 15 and consequently it is only necessary to turn the hand wheel in the proper direction in order to force the cutter into or out of operation in the manner above described.

In Figures 6 to 11 inclusive, I have illustrated a modified form of the invention, which differentiates from the preferred form in the manner of mounting the cutting bars, which arrangement eliminates the use of the sleeve or thimble 24. It will be noted that in this form of the invention the extension in which the cutting bars operate are made up of two sections indicated at 11', the meeting edges of which being formed with flanges 27 which are bolted or otherwise suitably secured thereto as clearly illustrated in Figure 8. The operating pinions 15' rotate in housings 14' as in the case of the preferred form of the invention, these pinions meshing with the teeth 26' of the cutting bars 25' as shown. These bars of course are mounted to operate in the same manner as the bars 25 above described are controlled through the same type of mechanism including the chain 19 which is trained over sprockets carried by the shafts 16' of the pinions, one of which shafts is equipped with a hand wheel 17'. But in this form of the invention, the cutting bars are not mounted upon a sleeve or thimble as in the case of the preferred embodiment of the invention, but are held in a position to be actuated by the pinions through the instrumentality of the sleeve 29 which is received by the extension made up of the sections 11'. This extension is provided with spaced annular flanges 30 and 31 respectively. The former being bolted or otherwise suitably secured to the adjacent end of the extension just referred to, while the other flange 31 is provided to form a connection with the intake pipe (not shown). So, the sleeve 29 constitutes a support and guide for the cutting bars which are mounted for movement independently of the sleeve, the invention otherwise operating in the same manner and for the same purpose described for the preferred form of the invention.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. In combination with a dredge pump comprising a casing having an extension projecting from one side thereof, of a plurality of cutting bars arranged within the extension and mounted for sliding movement toward and away from the impeller of said pump, teeth formed on the outer side of each cutting bar, a pinion meshing with the teeth of each bar, and means including a single operating element for simultaneously actuating all of said bars for the purpose specified.

2. A cutter attachment for dredge pump comprising a sleeve like member slidably mounted on the pump casing, cutting bars projecting from one side of the sleeve in the direction of the impeller of said pump, and means for sliding said sleeve to move said cutting bars toward and away from the impeller for the purpose specified.

3. A cutter attachment for dredge pumps comprising a sleeve like member mounted for sliding movement with relation to the pump casing, cutting bars projecting from the sleeve in the direction of the impeller of said pump, each bar having a plurality of teeth, pinions meshing with said teeth, and means for simultaneously rotating the pinions to move the cutting bars toward and away from the impeller for the purpose specified.

4. A cutter attachment for dredging pumps comprising a sleeve like member mounted for sliding motion with relation to the pump casing, cutting bars projecting from said sleeve in the direction of the impeller of said pump, teeth formed on each bar, a pinion meshing with the teeth of each bar, shafts supporting said pinions, and means for including a manually operable wheel for simultaneously rotating said shafts to move the cutter toward and away from the impeller for the purpose specified.

5. A cutter attachment for dredging pumps comprising a sleeve like member mounted for sliding movement with relation to the pump casing, cutting bars projecting from the sleeve in the direction of the impeller, said pump casing having grooves in which said bars operate, teeth formed on each bar, a pinion meshing with the teeth of each bar, shafts supporting said pinions, spaced parallel shafts geared to the pinion shafts, a driving connection between said parallel shafts, whereby one of said shafts are rotated in unison to move the cutter toward and away from the impeller, and means for rotating one of the parallel shafts.

6. The combination with a dredge pump including a casing having a central tubular extension adapted to be connected with the intake pipe, and an impeller operating in said casing, of a cutter attachment comprising a sleeve like member mounted for sliding movement in said tubular extension, cutting bars projecting from said sleeve like member in the direction of said impeller, said extension having grooves for the reception of said cutting bars, teeth formed on each cutting bar, a pinion meshing with the teeth of each bar, housings formed on the extension for said pinions, and operable means supported by the pump casing for simultaneously rotating said pinion to move the cutting bars toward and away from the impeller for the purpose specified.

In testimony whereof I affix my signature.

BENJAMIN F. DUPONT.